(12) United States Patent
Koch

(10) Patent No.: US 7,729,487 B2
(45) Date of Patent: Jun. 1, 2010

(54) CUSTOM RINGTONES FOR WIRELINE TELEPHONES

(75) Inventor: Robert A. Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1496 days.

(21) Appl. No.: 10/109,934

(22) Filed: Mar. 29, 2002

(65) Prior Publication Data

US 2004/0109558 A1    Jun. 10, 2004

(51) Int. Cl.
*H04M 3/42* (2006.01)
*H04M 1/00* (2006.01)

(52) U.S. Cl. .............................. 379/207.16; 379/373.02

(58) Field of Classification Search ............ 379/207.16, 379/373.01, 373.02, 52, 67.1, 171, 88.17, 379/372, 373.03
See application file for complete search history.

(56) References Cited

U.S. PATENT DOCUMENTS

| | | | | |
|---|---|---|---|---|
| 4,723,271 | A * | 2/1988 | Grundtisch | ................. 379/181 |
| 4,866,766 | A * | 9/1989 | Mitzlaff | ................. 379/373.02 |
| 5,371,781 | A * | 12/1994 | Ardon | ......................... 455/445 |
| 5,544,235 | A * | 8/1996 | Ardon | ......................... 379/177 |
| 5,659,596 | A * | 8/1997 | Dunn | ..................... 455/456.1 |
| 5,905,774 | A * | 5/1999 | Tatchell et al. | ............ 379/88.04 |
| 5,926,537 | A * | 7/1999 | Birze | ......................... 379/252 |
| 5,933,476 | A * | 8/1999 | Hansen et al. | ................. 379/52 |
| 5,978,451 | A * | 11/1999 | Swan et al. | ............... 379/88.24 |
| 6,031,899 | A * | 2/2000 | Wu | ....................... 379/142.01 |
| 6,094,587 | A | 7/2000 | Armanto | |
| 6,108,329 | A | 8/2000 | Oyama | |
| 6,178,230 | B1 * | 1/2001 | Borland | ...................... 379/67.1 |
| 6,304,651 | B1 | 10/2001 | Cramer | |
| 6,310,944 | B1 * | 10/2001 | Brisebois et al. | ........ 379/142.01 |
| 6,314,306 | B1 | 11/2001 | Harris | |
| 6,366,791 | B1 * | 4/2002 | Lin et al. | ...................... 455/567 |
| 6,385,303 | B1 * | 5/2002 | Peterson et al. | ............. 379/67.1 |
| 6,404,880 | B1 * | 6/2002 | Stevens | .................. 379/221.11 |
| 6,418,330 | B1 * | 7/2002 | Lee | ............................ 455/567 |
| 6,519,326 | B1 * | 2/2003 | Milewski et al. | ............ 379/67.1 |
| 6,628,194 | B1 | 9/2003 | Hellenbust et al. | |
| 6,650,746 | B1 | 11/2003 | Groen et al. | |
| 6,714,637 | B1 * | 3/2004 | Kredo | .................... 379/215.01 |
| 6,718,021 | B2 * | 4/2004 | Crockett et al. | ........... 379/93.23 |
| 6,778,648 | B1 * | 8/2004 | Alston et al. | .............. 379/93.27 |
| 7,012,999 | B2 * | 3/2006 | Ruckart | ..................... 379/88.21 |
| 7,149,208 | B2 * | 12/2006 | Mattaway et al. | ............ 370/352 |
| 7,254,219 | B1 * | 8/2007 | Hansen et al. | ............ 379/88.17 |
| 7,295,656 | B2 * | 11/2007 | Ruckart | .................... 379/88.21 |
| 2002/0071546 | A1 | 6/2002 | Brennan | |
| 2002/0115456 | A1 * | 8/2002 | Narinen et al. | ............... 455/466 |
| 2003/0002486 | A1 * | 1/2003 | Emerson, III | ................ 370/352 |
| 2003/0169151 | A1 | 9/2003 | Ebling et al. | |

* cited by examiner

*Primary Examiner*—Quochien B Vuong
(74) *Attorney, Agent, or Firm*—Scott P. Zimmerman PLLC

(57) ABSTRACT

Methods, systems, and apparatuses are disclosed for selecting a ringtone to accompany an incoming call to a wireline telephone. The incoming call is received at a switch, the ringtone is selected, and a data message is sent to the called station. The data message includes information representing the selected ringtone. The incoming call is connected to the called station via a wireline connection. Another embodiment allows a user to select the ringtone, and the selected ringtone is communicated to an intelligent telecommunications switch. The user's selected ringtone is then presented during the incoming call to the wireline telephone.

19 Claims, 11 Drawing Sheets

CUSTOM RINGTONES FOR WIRELINE TELEPHONES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computers and to telephony and, more particularly, to methods, systems, and apparatuses that allow a user to select and to receive custom ringtones for incoming telephone calls to a wireline telephone.

2. Description of the Related Art

Custom ringtones are popular in wireless telephony. A wireless user can program a wireless telephone to provide different rings for incoming telephone calls. The user is typically provided a selection of ringtones, and the user associates the telephone number of the calling party with a specific ringtone. The user may even download a greater variety of ringtones from the World Wide Web. The custom ringtones differentiate the user's wireless telephone from another person's wireless telephone, and the custom ringtones alert the user to the identity of the calling party.

Although custom ringtones have become very popular, no similar service is commercially offered for wireline telephones. A wireline telephone has the same ring pattern for each incoming telephone call (although Ringmaster service allows a wireline telephone to have distinct ring patterns, a different telephone number must be dialed for ring pattern). There is, accordingly, a need in the art for custom ringtones for wireline telephones.

BRIEF SUMMARY OF THE INVENTION

The aforementioned problems are reduced by an Client Ringtone Module. The Client Ringtone Module comprises computer programs, computer systems, and telecommunications systems that allow a user to customize ringtones for wireline telephones. The user may select a desired ringtone based upon the time of day, the day of week, the calling telephone number, or any other user-defined criteria. The desired ringtone is then preferably presented on a computer or Internet Protocol phone to provide an alert of an incoming call to the wireline telephone. The Client Ringtone Module provides a convenient and user-friendly web-interface that allows the user to select ringtones and to specify the conditions for each ringtone. The Client Ringtone Module thus integrates telephony events with data network events (such as World-Wide-Web packetized messages).

One aspect of this invention describes a method of selecting a ringtone for a wireline telephone. A "wireline" telephone sends and receives signals using the copper wires of a telephone system local loop over a broadband connection, e.g, a home network connection, a Digital Subscriber Line (DSL) connection, or an Ethernet connection. An incoming call is received from a calling party to a called party. A ringtone is selected, and a data message is sent over a data network to the called party. The data message includes information associated with the selected ring tone. The incoming call is then connected to the called party via a wireline connection to the wireline telephone.

Another embodiment describes a telecommunications system. The system includes a database and a telecommunications switch. The database stores ringtones for wireline telephones. The telecommunications switch establishes a wireline connection to a called party. The telecommunications switch sends a telephone call and a data message to the called party via the wireline connection. The data message includes information associated with a desired ringtone to accompany the telephone call.

Still another embodiment describes method for selecting ringtones. A data message is received from a data network. The data message includes information associated with a selected ringtone for an incoming call to a wireline telephone. The selected ringtone is retrieved from memory and presented to alert of the incoming call to the wireline telephone.

Another aspect of this invention describes a method for selecting ringtones. A data message is received from a data network. The data message includes network information associated with an incoming call to a wireline telephone. An analysis is performed based upon the network information received in the data message to determine which ringtone to use. A ringtone is retrieved from memory, with the ringtone associated with the network information. The ringtone is presented to alert of the incoming call to the wireline telephone.

Still another aspect of the invention describes an apparatus that generates ringtones for incoming telephone calls to a wireline telephone. The apparatus includes a network port, a memory device, and a digital signal processor. The network port receives a data message from a data network. The memory device stores a selection of ringtones to accompany the incoming telephone call to the wireline telephone. The digital signal processor communicates with the memory device and selects a ringtone based upon information contained within the data message. The information contained within the data message could be associated with the ringtone, and the ringtone would be selected by a telecommunications system to accompany the incoming telephone call. The information contained within the data message could also be associated with telephone network information provided by the telecommunications system. After the ringtone is selected and retrieved from the memory device, the apparatus could also include a system for generating the selected ringtone to alert of the incoming telephone call.

A further embodiment describes a system for selecting ringtones. This system comprises a processor and a Client Ringtone Module stored in memory. The Client Ringtone Module receives a data message from a data network. The data message includes information that the Client Ringtone Module uses to select a ringtone to accompany an incoming call to a wireline telephone. Once the ringtone is selected, the processor and the Client Ringtone Module cooperate to present the selected ringtone with the incoming call to the wireline telephone.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
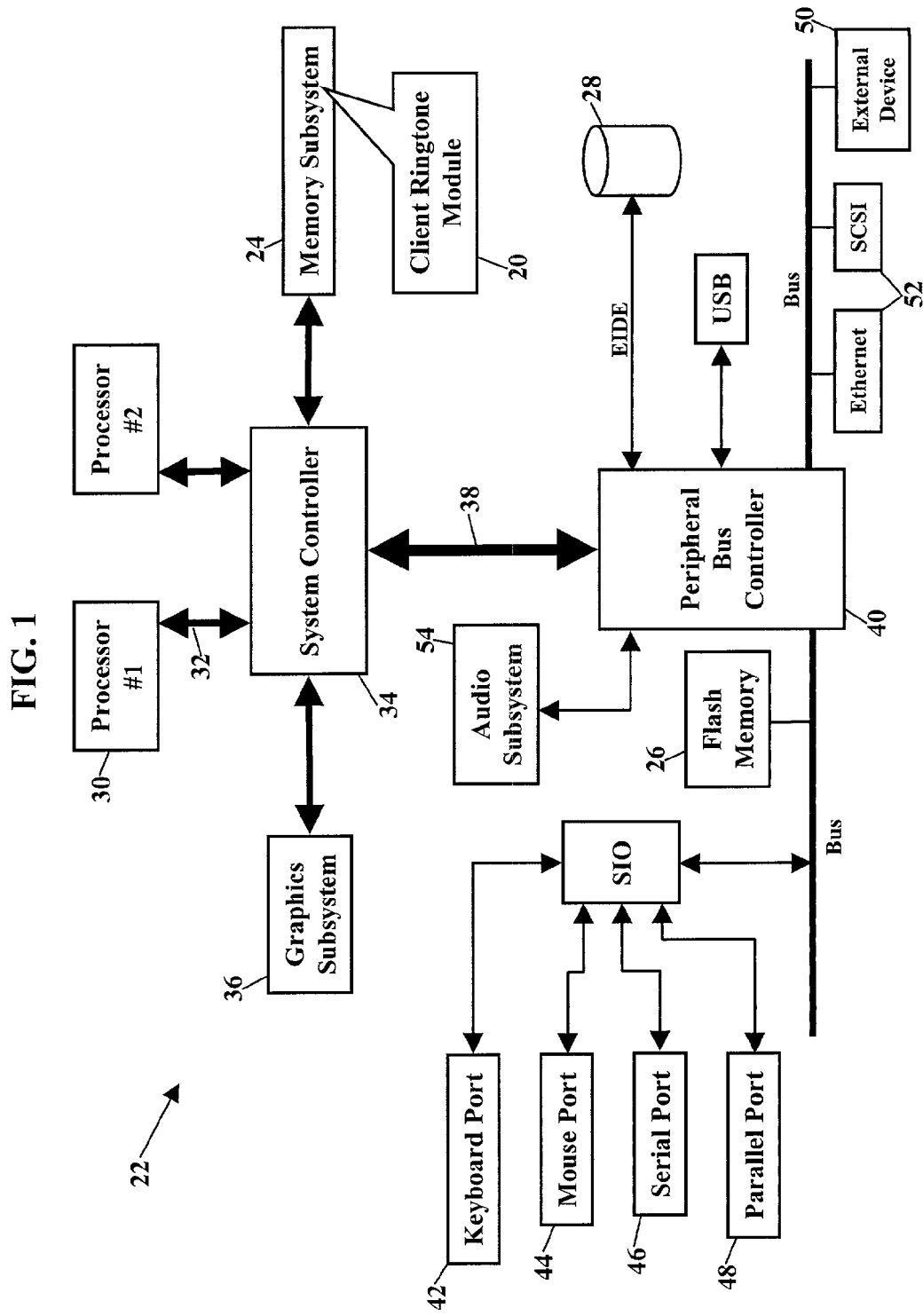
FIG. 1 is a block diagram showing one embodiment of the Client Ringtone Module that resides in a computer system.
Figure 2:
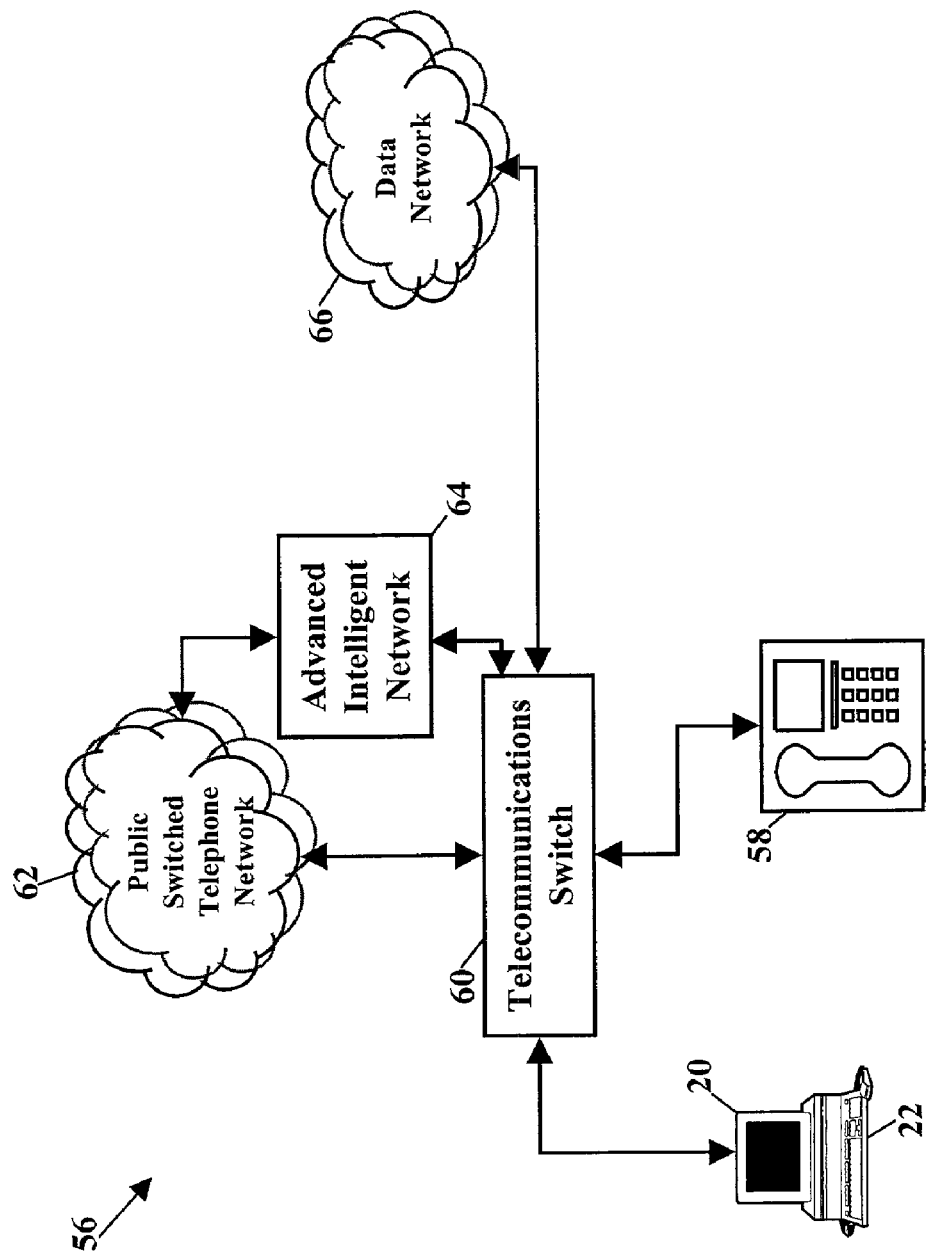
FIG. 2 is a schematic showing the Client Ringtone Module operating within a telecommunications system.

FIGS. 1 and 2 depict possible operating environments for an embodiment of this invention. This embodiment of a Client Ringtone Module 20 includes a computer program that allows a user to customize ringtones for wireline telephones. The Client Ringtone Module 20 allows the user to select a desired ringtone based upon the time of day, the day of week, the calling telephone number, or many other subscriber-defined criteria. The selected ringtone may include a note, a sound, a song, a graphic, an animation, and/or a sound to accompany an incoming call to the wireline telephone. When an incoming call is received at the wireline telephone via a wireline connection, the selected ringtone is audibly and/or visually presented at a computer or Internet Protocol phone communicating with the wireline connection.

FIG. 1 is a block diagram showing the Client Ringtone Module 20 residing in a computer system 22. The Client Ringtone Module 20 operates within a system memory device. The Client Ringtone Module 20, for example, is shown residing in a memory subsystem 24. The Client Ringtone Module 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 2 is a schematic showing the Client Ringtone Module operating within a telecommunications system 56. This telecommunications system 56 further represents an operating environment for the Client Ringtone Module 20. The Client Ringtone Module 20 operates within the memory (such as memory subsystem 24, flash memory 26, or peripheral storage device 28 shown in FIG. 1) of the computer system 22. The Client Ringtone Module 20 could alternatively operate with the memory of an Internet Protocol (IP) phone 58. The telecommunications system 56 includes a telecommunications switch 60 of a Public Switched Telephone Network 62. The telecommunications switch 60 includes Advanced Intelligent Network (AIN) componentry 64 controlling many features of the telecommunications switch 60. The telecommunications switch 60 could also include a packet-based "softswitch" that uses software control to provide voice, data, and video services by dynamically changing its connection data rates and protocols types. In this case the AIN componentry 64 is replaced by an application server that interfaces with the softswitch via a packet protocol, such as Session Initiation Protocol (SIP). The computer system 22 may also interface with a data network 66 via a connection to the telecommunications switch 60. The packetized signaling between the central office switch 60, the Public Switched Telephone Network 62, the Advanced Intelligent Network 64, and the data network 66, however, is well understood in the art and will not be further described.

Figure 3:
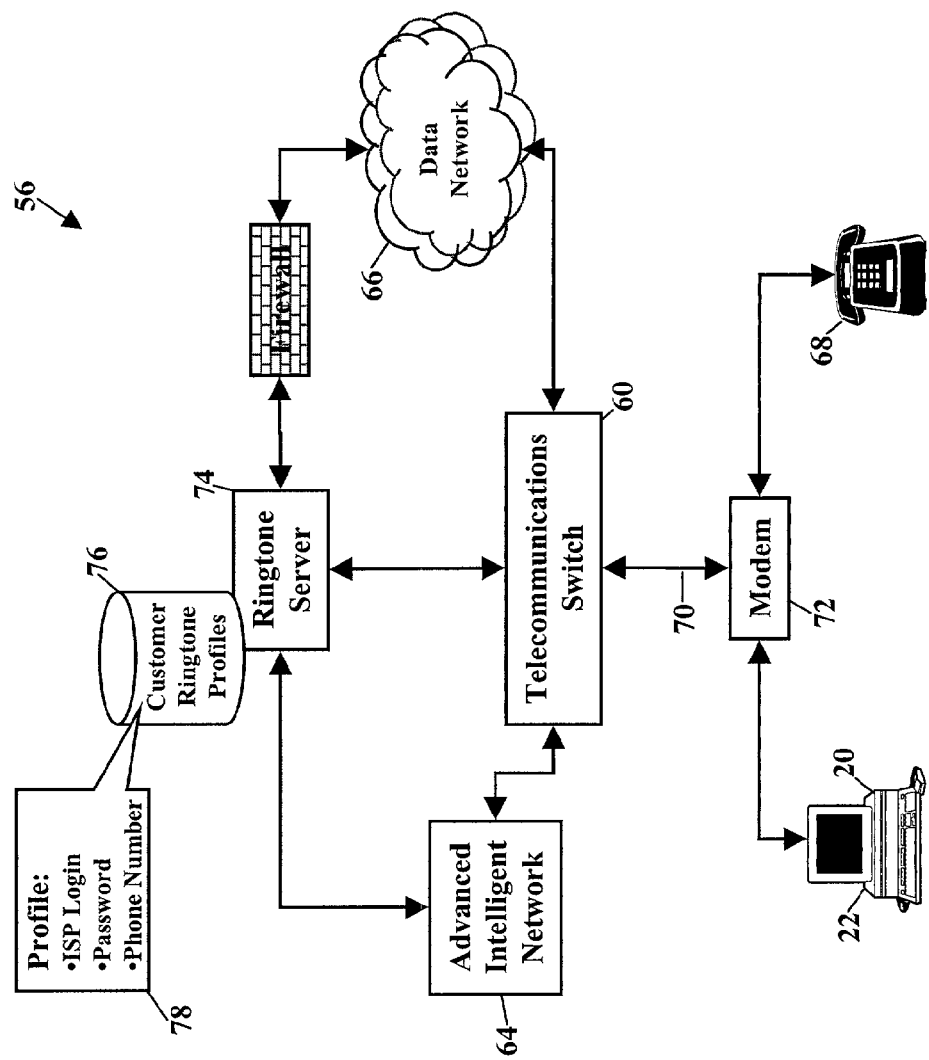
FIG. 3 is a detailed schematic of the telecommunications system shown in FIG. 2.

FIG. 3 is a detailed schematic of the telecommunications system 56 shown in FIG. 2. FIG. 3 illustrates how the Client Ringtone Module 20 may be used to establish a ringtone profile for a wireline telephone 68. The computer system 22 and the wireline telephone 68 communicate with the telecommunications switch 60 via a wireline connection 70 to a cable/DSL modem 72. The computer system 22 thus receives packetized data messages from the data network 66 via the wireline connection 70 to the telecommunications switch 60, while the wireline telephone 68 receives an incoming telephone call via the wireline connection 70 to the telecommunications switch 60. The Client Ringtone Module 20 may, therefore, be downloaded via the data network 66 from a ringtone server 74. The Client Ringtone Module 20 is stored, and operates, within the memory of the computer system 22.

The Client Ringtone Module 20 is used to establish a ringtone profile for the wireline telephone 68. The ringtone server 74 stores a database 76 of customer ringtone profiles. A user interacts with the Client Ringtone Module 20 and with the computer system 22 to access the ringtone server 74, to login to the ringtone server 74, and to establish a profile 78 in the database 76 of customer ringtone profiles. As FIG. 3 shows, the profile 78 could contain, for example, the user's Internet Service Provider (ISP) login information, a password, and a phone number of the wireline telephone 68.

Figure 4:
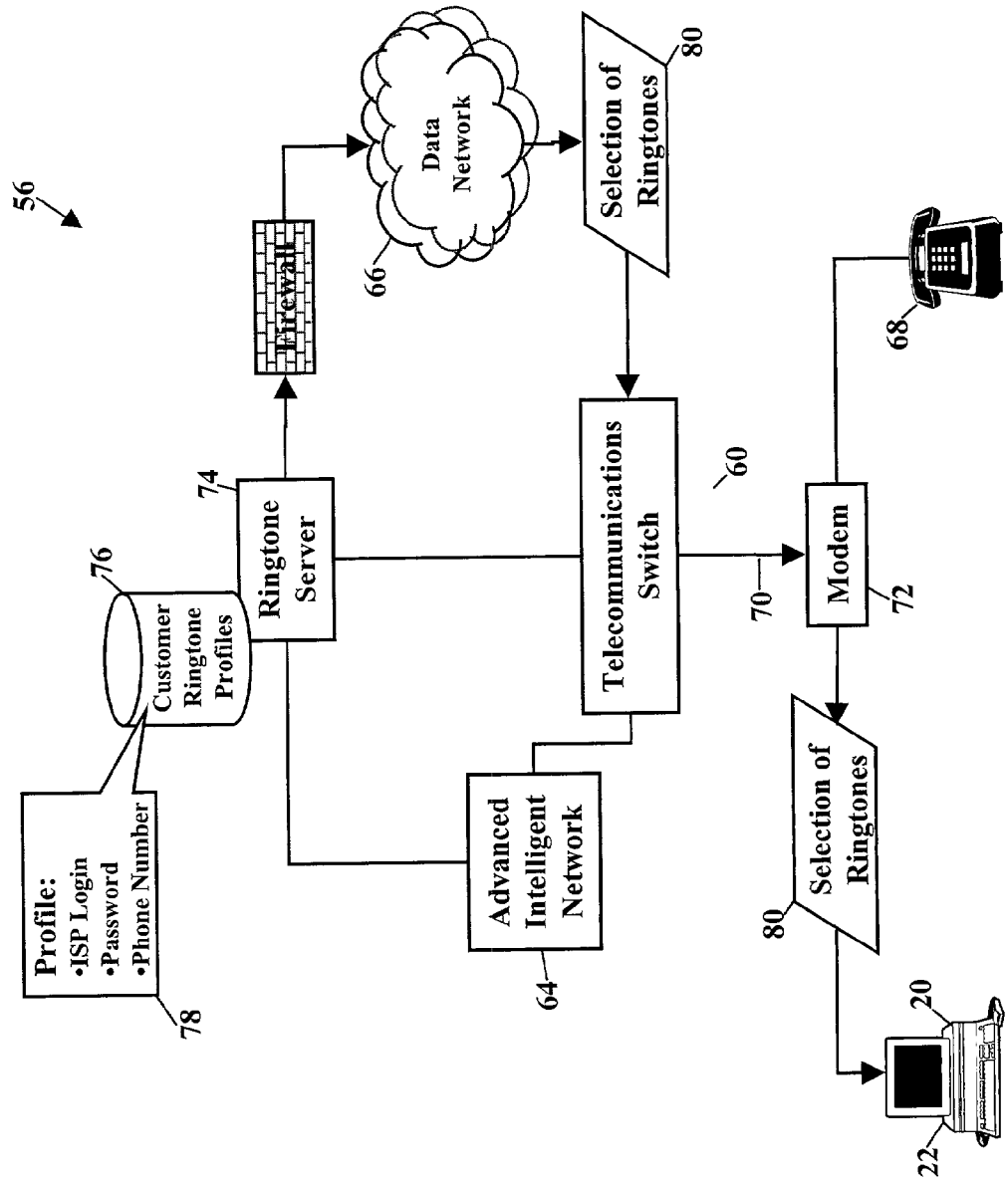
FIG. 4 is a schematic illustrating the selection of ringtones according to one embodiment of this invention.

FIG. 4 is a schematic illustrating the selection of ringtones. After the user establishes the profile 78 in the database 76 of customer ringtone profiles, the user interacts with the Client Ringtone Module 20 to download a selection 80 of ringtone files. These audio files may also come from another source, e.g., downloaded from the World Wide Web. The selection 80 of ringtone files is communicated from the ringtone server 74, over the data network 66, through the telecommunications switch 60, and via the wireline connection 70 to the computer system 22. The selection 80 of ringtone files could include any note, sound, or song file that the user might desire in a file format, e.g., .wav format, that can be interpreted by the Client Ringtone Module 20 for presentation to the called party. The selection 80 of ringtone files, however, could also include graphics files and animation files that would be executed by the computer system 22 and visually and/or audibly presented at the computer system 22. The selection 80 of ringtone files are then stored within the memory (such as memory subsystem 24, flash memory 26, or peripheral storage device 28 shown in FIG. 1) of the computer system 22. The selection 80 of ringtone files preferably resides in the same directory structure as the Client Ringtone Module 20.

Figure 5:
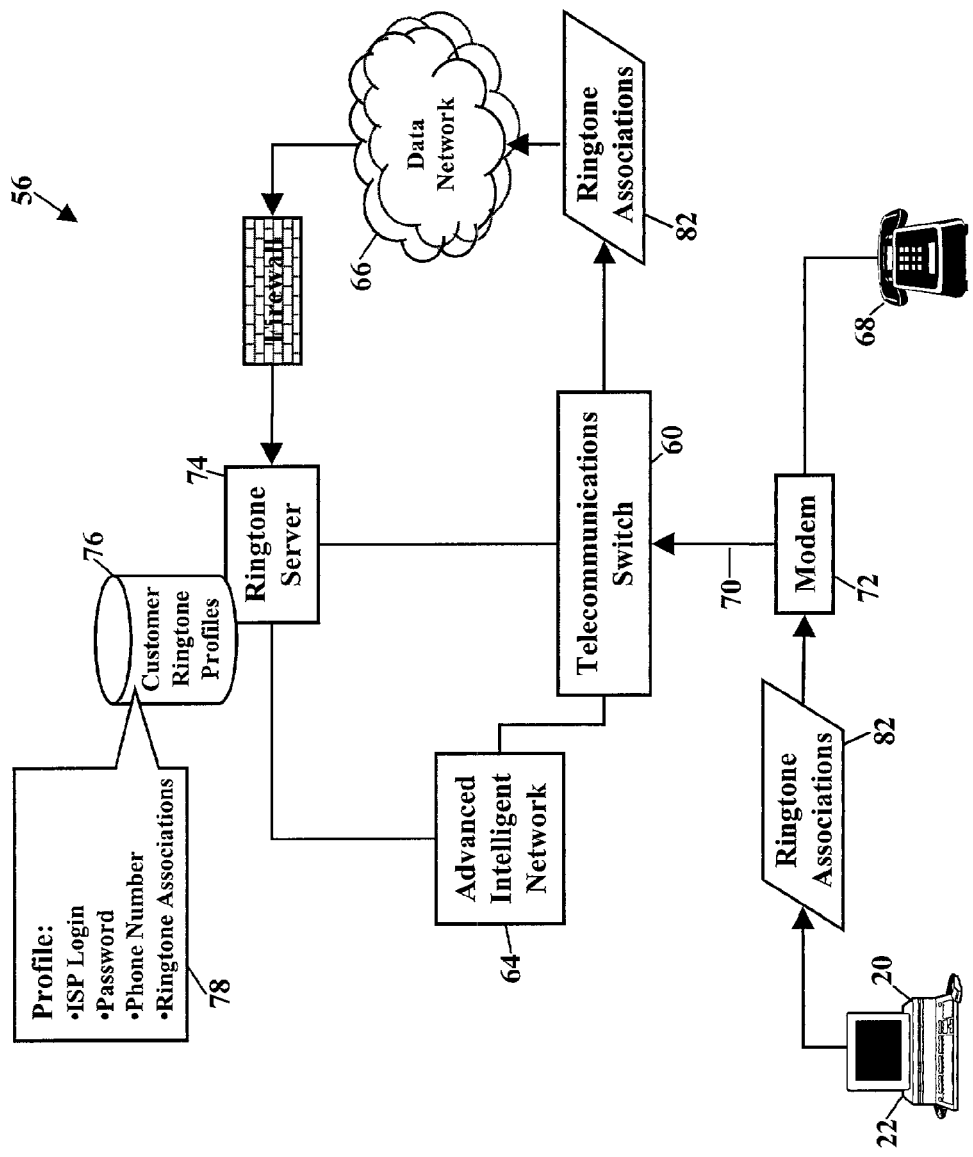
FIG. 5 is a schematic showing a user may customize the ringtones according to an embodiment of this invention.

FIG. 5 is a schematic showing how the user may customize the ringtones. After the user has downloaded their selection of ringtone files (shown as reference numeral 80 in FIG. 4), the user interacts with the Client Ringtone Module 20 to customize their ringtones. The Client Ringtone Module 20, in other words, allows the user to select which ringtone is played and under what conditions that ringtone is played. The Client Ringtone Module 20 allows the user to select a different ringtone file based upon the time of day and/or the day of week. The user, for example, could select a first ringtone file for calls received between 8-12 each morning, while a second ringtone file is selected only for calls received on Friday afternoons. The Client Ringtone Module 20 also allows the user to associate ringtones with telephone numbers. The user, for example, could select a third ringtone file when the calling party is a work phone number, a fourth ringtone file when the calling party is a spouse's cell phone number, and a fifth ringtone file when the calling party is the grandparent's phone number. The Client Ringtone Module 20 also allows the user to select unique ringtones for unlisted telephone numbers, for CallerID-Blocked telephone numbers, for "private" telephone numbers, and for "out-of-area" telephone numbers. Once the user has customized the ringtones, the Client Ringtone Module 20 communicates ringtone associations 82 to the ringtone server 74. The ringtone associations 82 represent the user's customized ringtones. The ringtone associations 82 are communicated via the wireline connection 70, through the telecommunications switch 60, over the data network 66, and to the ringtone server 74. The profile 78 is then updated with the user's ringtone associations 82.

Figure 6:
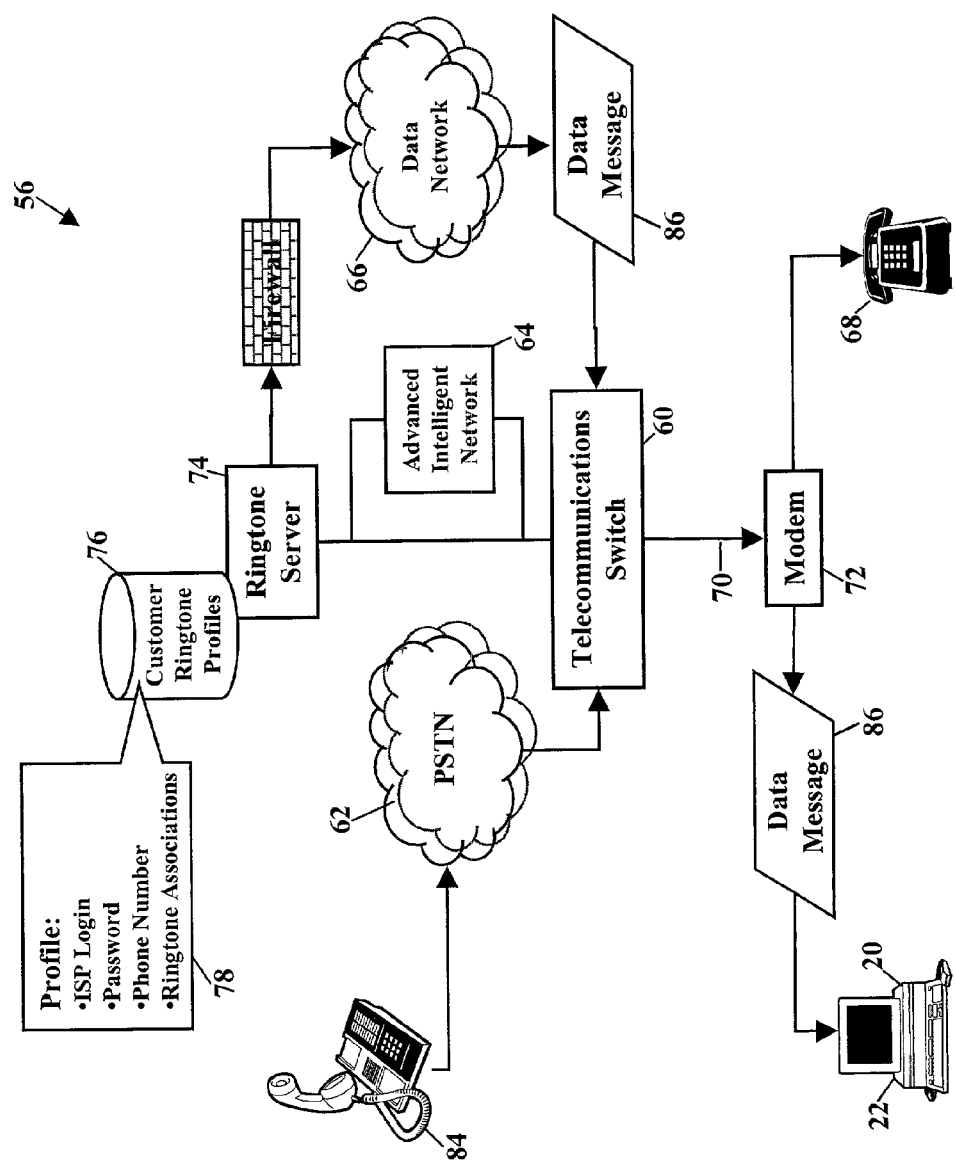
FIGS. 6 and 7 are schematics illustrating the processing of an incoming call to a wireline telephone according to one embodiment of this invention.

FIG. 6 is a schematic illustrating the processing of an incoming call to the wireline telephone 68. A calling party uses a communications device to place a call to the wireline telephone 68. FIG. 6 shows the communications device as a telephone 84. The call is routed from the telephone 84 and into the Public Switched Telephone Network 62. If, on the other hand, the communications device is a wireless device, the call is transmitted to an antenna (not shown), then coupled to a mobile switch (also not shown), and then routed into the Public Switched Telephone Network 62. The Public Switched Telephone Network 62 routes the call to the local central office telecommunications switch 60 serving the wireline telephone 68. The intelligence controlling the telecommunications switch 60 (such as the Advanced Intelligence Network 64) detects that customized ringtone service is required (the AIN environment, for example, would detect a trigger for customized ringtone service). The call is suspended and a query is sent to the ringtone server 74 for the appropriate ringtone. The ringtone server 74 accesses the subscribing user's profile 78, reads the subscribing user's ringtone associations, and selects which ringtone is appropriate.

Once the appropriate ringtone is selected, the ringtone server 74 then requests that the appropriate ringtone be presented with the incoming call. If the user has a static Internet Protocol address for the computer system 22, this static Internet Protocol address will usually be known from the user's profile 78. The ringtone server 74, therefore, sends a data message 86 to the computer system 22. The data message 86 includes information associated with the selected ringtone. The data message 86 is addressed to the Internet Protocol address of the computer system 22. The data message 86 routes over the data network 66, through the telecommunications switch 60, and to the computer system 22 via the wireline connection 70 and the modem 72. The data message 86 includes information associated with the name of the selected ringtone. The Client Ringtone Module 20 receives the data message 86 and retrieves the selected ringtone file from the memory of the computer system 22. The selected ringtone file is then audibly and/or visually presented at the computer system 22. Once the selected ringtone is presented at the computer system 22, the telecommunications switch 60 then resumes processing the call. The call is routed to the wireline telephone 68 via the wireline connection 70 and the modem 72.

The computer system 22 plays the selected ringtone. The selected ringtone file resides in the computer system 22, and the data message 86 tells the Client Ringtone Module 20 which ringtone to play. The data message 86 may include any protocol that is appropriately understood for the ringtone server 74, the data network 66, the computer system 22, and the Client Ringtone Module 20. Once the data message 86 is received, the Client Ringtone Module 20 and the computer system 22 present the ringtone to the user. The Client Ringtone Module 20 and the computer system 22, for example, could cause the ringtone to be audibly presented over a pair of speakers. If the ringtone has graphical and/or animation content, the Client Ringtone Module 20 and the computer system 22 could also visually present the ringtone on a video display.

The user may also specify when the ringtone is presented. The user may have the Client Ringtone Module 20 present the ringtone prior to receipt of the incoming call at the wireline telephone 68. If the ringtone is presented prior to the incoming call, the ringtone would give the user advance notice of the calling party. The user could, alternatively, have the Client Ringtone Module 20 present the ringtone with the incoming call to the wireline telephone 68.

Figure 7:
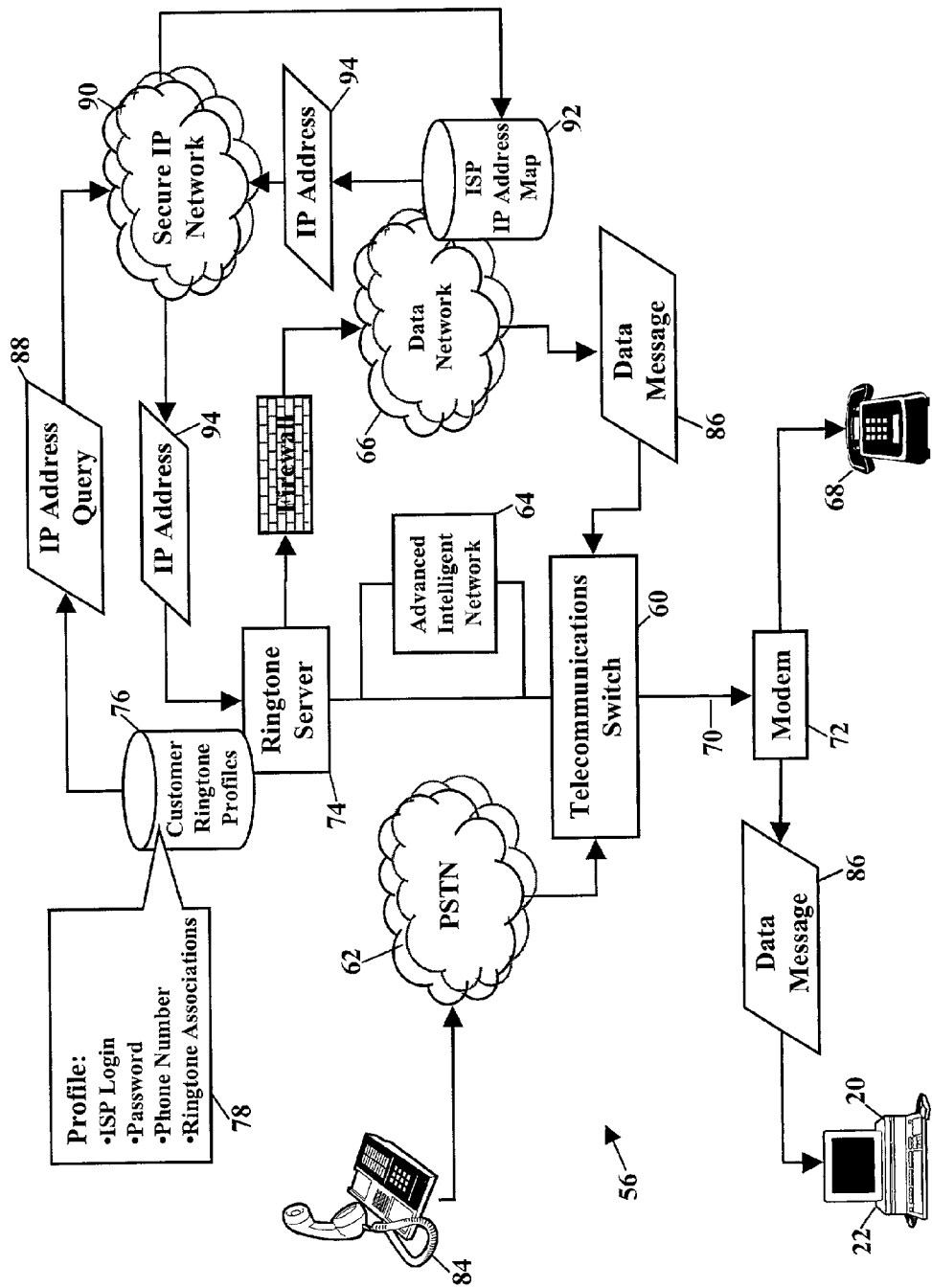

FIG. 7 is also a schematic illustrating the processing of the incoming call to the wireline telephone 68. FIG. 7 differs from FIG. 6, however, in that FIG. 7 illustrates a call flow for dynamic Internet Protocol addressing. Some Internet Service Providers assign a "static" Internet Protocol address to a user's account, whereas other Internet Service Providers dynamically change a user's Internet Protocol address. A static Internet Protocol address is permanently assigned to the user, while a dynamic Internet Protocol address may change with each login or may dynamically change during a session. FIG. 7 illustrates additional queries that are made for dynamic Internet Protocol addressing.

FIG. 7 similarly routes the call as shown in FIG. 6. The call routes from the telephone 84, into the Public Switched Telephone Network 62, and to the local central office telecommunications switch 60 serving the wireline telephone 68. The intelligence controlling the telecommunications switch 60 detects a request for customized ringtone service and the call is suspended. A query is sent to the ringtone server 74 for the appropriate ringtone. The ringtone server 74 accesses the user's profile 78, reads the user's ringtone associations, and selects which ringtone is appropriate. Once the appropriate ringtone is selected, the ringtone server 74 then prepares to send the data message 86 to the computer system 22. The data message 86 includes information associated with the selected ringtone.

Before the data message 86 can be sent, however, the dynamic Internet Protocol address of the computer system 22 must be determined. An IP address query 88 is sent from the ringtone server 74, routed over a secure IP network 90, and to an Internet Service Provider serving the computer system 22. The IP address query 88 requests the current Internet Protocol address assigned to the computer system 22. FIG. 7 shows the current Internet Protocol address being retrieved from a database 92 that maps telephone numbers to Internet Protocol addresses. The current Internet Protocol address, for example, could be determined from the Internet Service Provider login information. If the ISP login information contained within the profile 78 matches the Internet Service Provider's login information, then the ringtone server 74 could have access to the database 92.

Regardless of how the Internet Protocol address is accessed, the current IP address 94 is returned. The current IP address 94 routes over the secure IP network 90 and to the ringtone server 74. With the current Internet Protocol address known, the ringtone server 74 may now send the data message 86. The data message 86, including information associated with the selected ringtone, is sent to the Internet Protocol address of the wireline telephone 68 and to the computer system 22. The data message 86 routes over the data network 66, through the telecommunications switch 60, and to the computer system 22 via the wireline connection 70. The Client Ringtone Module 20 receives the data message 86, retrieves the selected ringtone file, and then audibly and/or visually presents the ringtone at the computer system 22.

Figure 8:
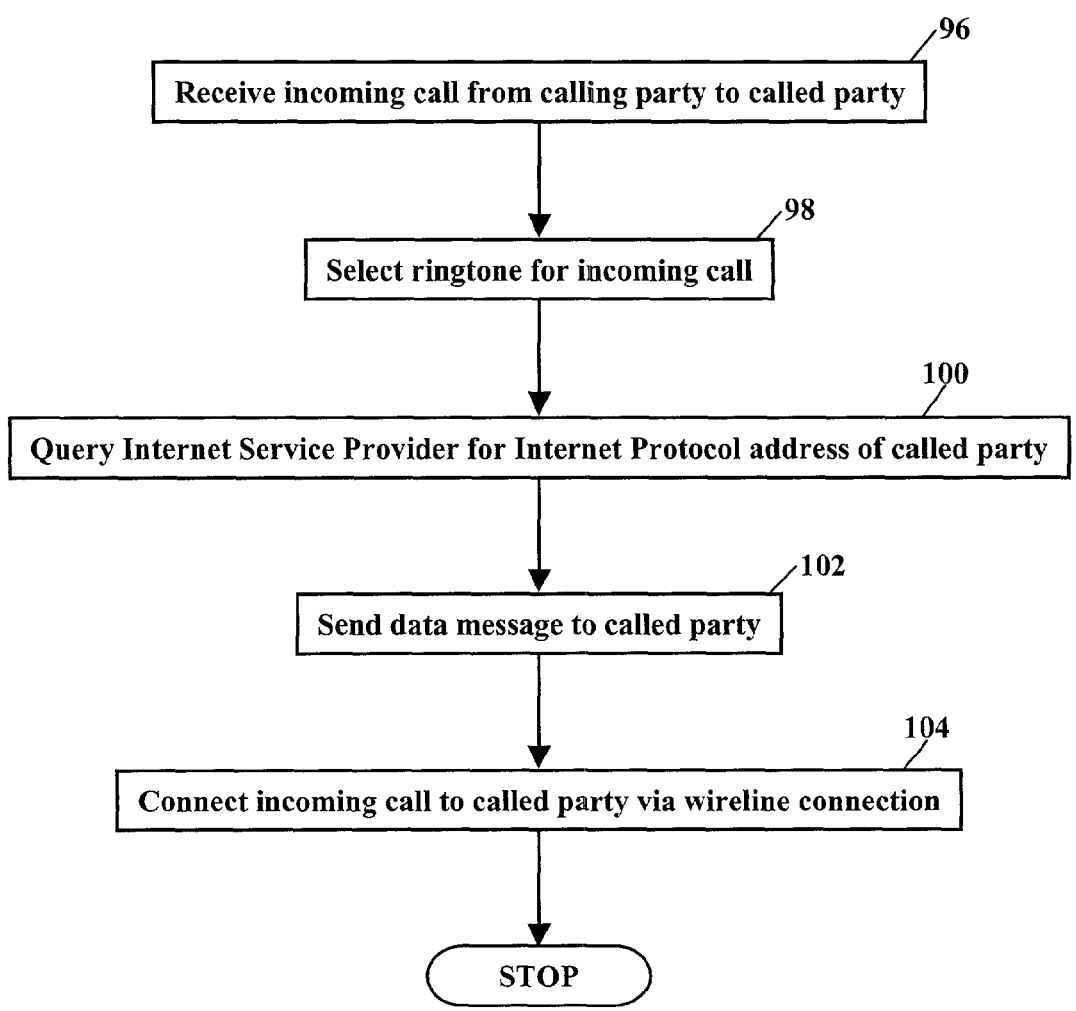
FIG. 8 is a flowchart showing one method of providing ringtones for a wireline telephone according to an embodiment of this invention.

FIG. 8 is a flowchart showing one method of providing ringtones for a wireline telephone. A telecommunications switch (such as that shown and described as reference numeral 60 in FIGS. 2-7) receives an incoming call from a calling party to a called party (Block 96). A ringtone is selected for the incoming call (Block 98). An Internet Service Provider is queried, if needed, for an Internet Protocol address of the called party (Block 100). A data message is sent through the telecommunications switch to the called party (Block 102), with the data message including information associated with the selected ring tone. The telecommunications switch connects the incoming call to the called party via a wireline connection (Block 104).

Figure 9:
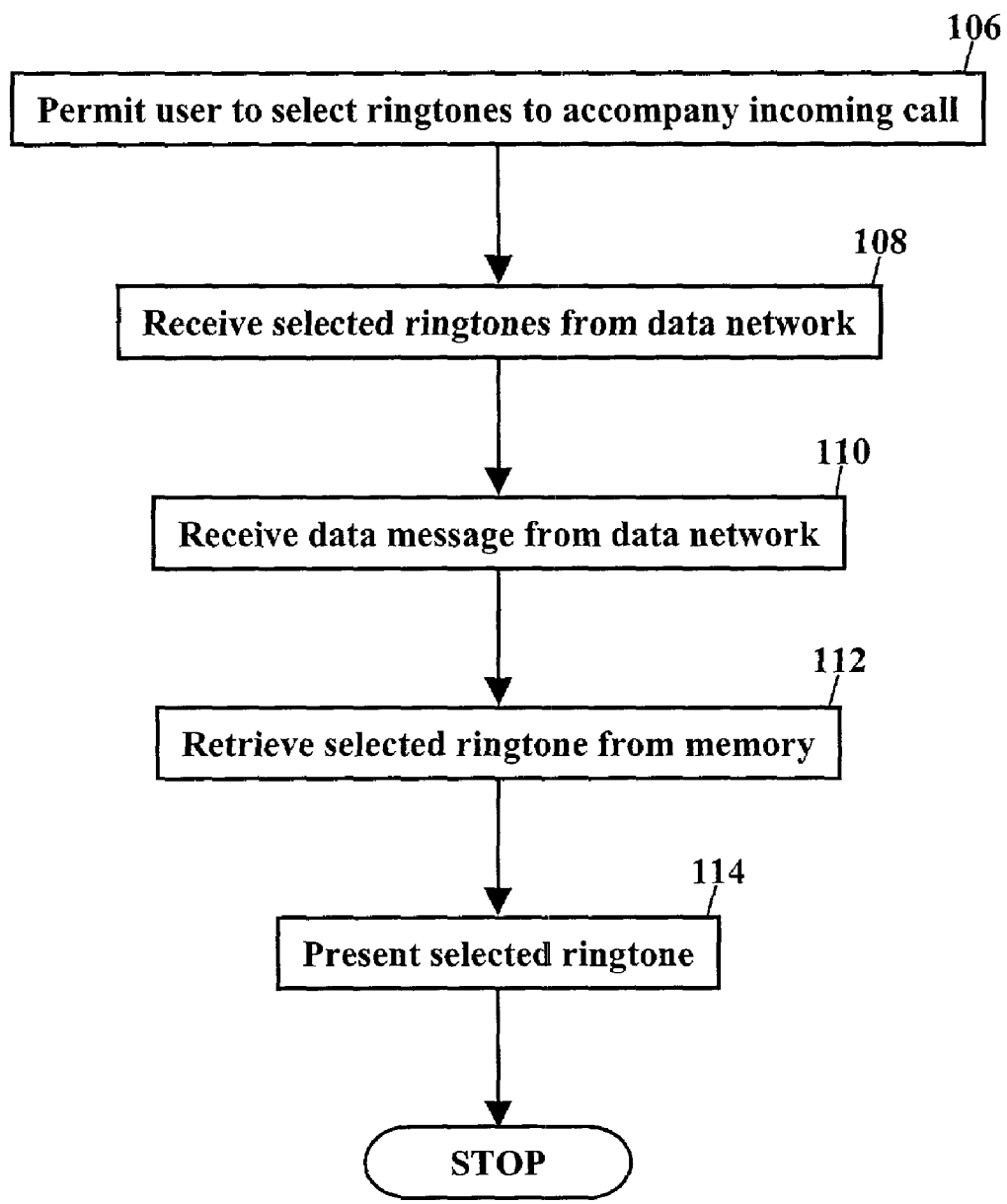
FIG. 9 is a flowchart showing an alternative method of providing ringtones for a wireline telephone.

FIG. 9 is a flowchart showing an alternative method of providing ringtones for a wireline telephone. This alternative method represents one embodiment of the Client Ringtone Module (shown as reference numeral 20). A user is permitted to select ringtones to accompany an incoming call to the wireline telephone (Block 106). The selected ringtones are downloaded and received from a data network (Block 108). When the appropriate ringtone is selected to accompany the incoming call, the Client Ringtone Module receives a data message from the data network (Block 110). The data message tells the Client Ringtone Module which ringtone is to be presented. The Client Ringtone Module retrieves the selected ringtone from memory (Block 112) and presents the selected ringtone to alert of the incoming call (Block 114).

Figure 10:
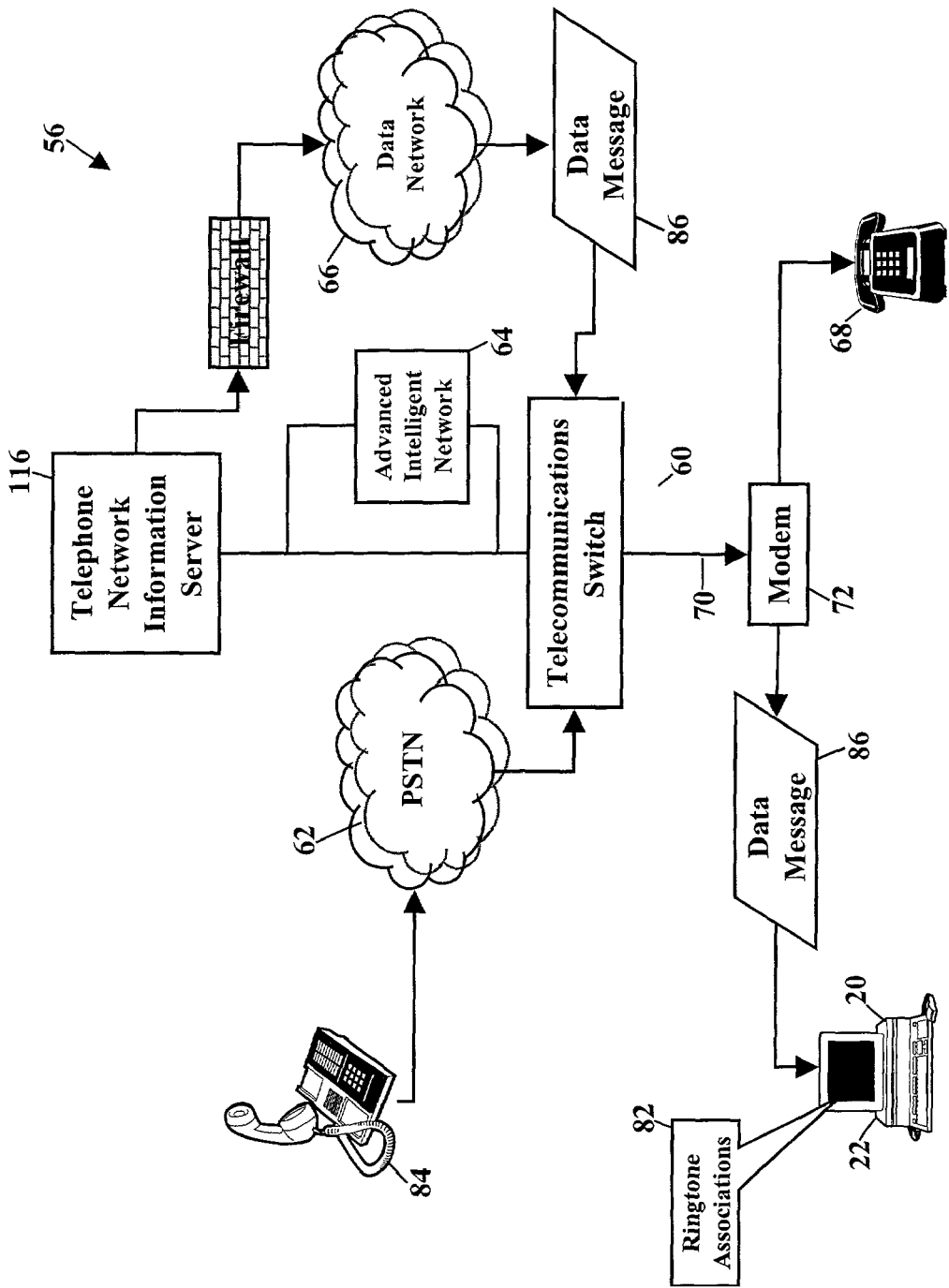
FIG. 10 is a schematic showing an alternative embodiment for the Client Ringtone Module.

FIG. 10 is a schematic showing an alternative embodiment for the Client Ringtone Module 20. This alternative embodiment stores the user's ringtone associations 82 within the memory of the computer system 22. The Client Ringtone Module 20, again, operates within the memory of the computer system 22. The incoming call routes from the telephone 84, into the Public Switched Telephone Network 62, and to the local central office telecommunications switch 60 serving the wireline telephone 68. The intelligence controlling the telecommunications switch 60 suspends the processing of the call. A telephone network information server 116 is queried for telephone network information regarding the call. The telephone network information could include the time and date of the call and the telephone number of the calling party. Once the telephone network information is known, the telephone network information server 116 then sends the data message 86 to the computer system 22. The data message 86 includes the telephone network information associated with the incoming call.

The data message 86 is delivered to the Internet Protocol address assigned to the computer system 22, as previously described. When the Client Ringtone Module 20 receives the data message 86, the Client Ringtone Modules 20 accesses the user's ringtone associations. The ringtone associations 82, in this embodiment, are stored within the memory of the computer system 22. The Client Ringtone Module 20 uses the ringtone associations 82, and the telephone network information contained within the data message 86, to determine the appropriate ringtone to accompany the incoming call. The Client Ringtone Module 20 could select the appropriate ringtone based upon the time of day, the day of the week, and/or the telephone number of the calling party. After the Client Ringtone Module 20 selects the appropriate ringtone, the selected ringtone is retrieved from memory and then audibly and/or visually presented at the computer system 22. The Client Ringtone Module 20 of this embodiment, therefore, includes logic to select which ringtone is appropriate to accompany the incoming call.

Figure 11:
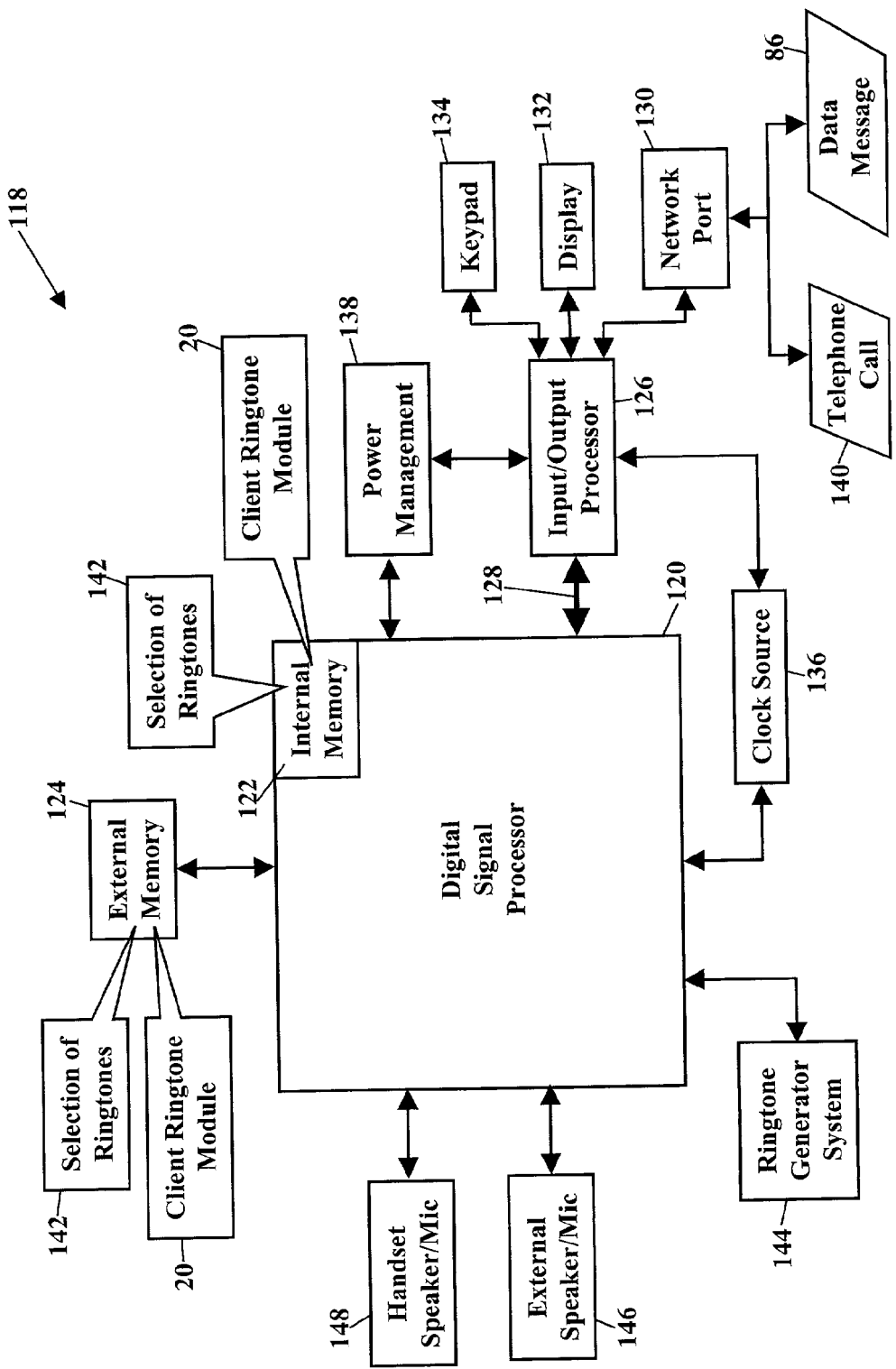
FIG. 11 is a block diagram of an apparatus embodying this invention.

FIG. 11 is a block diagram of an apparatus 118 embodying this invention. This apparatus 118 generates a custom ringtone for an incoming telephone call to a wireline telephone. The apparatus 118 could be embodied in a communications device, such as an Internet Protocol telephone. The apparatus 118 includes the Client Ringtone Module 20 operating within a memory device of a digital signal processor 120. The memory device could include internal memory 122 of the digital signal processor 120, or the memory device could include an external memory device 124 communicating with the digital signal processor 120. The digital signal processor 120 converts analog signals to digital signals and converts digital signals to analog signals. The digital signal processor 120 could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor 120 are known and, thus, will not be further discussed.

The digital signal processor 120 interfaces with an input/output processor 126. The input/output processor 126 controls system I/O and provides telephony-like control features. A bus 128 provides a signal communication path between the digital signal processor 120 and the input/output processor 126. The input/output processor 126 is a microprocessor that includes memory (not shown), communication controllers (not shown), and peripheral controllers (not shown). The communication controllers, for example, could control packet-based communications with a data network (shown as reference numeral 66 in FIGS. 2-7 and 10) through a network port 130. The communication controllers could also control packet-based communications with a telecommunications switch (shown as reference numeral 60 in FIGS. 2-7 and 10) through the network port 130. The peripheral controllers provide an interface with an LCD/LED/CRT display 132 and with telephony-like control features, such as a keypad 134. A clock source 136 provides a system clock for the apparatus 118, and the clock source 136 may also include higher and lower frequency multiples of the system clock depending upon power requirements and power availability. A power management system 138 provides differing power control mechanisms, such as a sleep mode and a low-power mode, to efficiently utilize available power and to reduce thermal management concerns.

The apparatus 118 plays custom ringtones for incoming calls. If, for example, the apparatus 118 communicates with the telecommunications switch (shown as reference numeral 60 in FIGS. 2-7 and 10), the Client Ringtone Module 20 causes the apparatus 118 to play a custom ringtone to alert a user of an incoming telephone call 140. The network port 130 receives the data message 86 via the wireline connection (shown as reference numeral 70 in FIGS. 2-7 and 10) to the telecommunications switch. The data message 86 is received from the data network (shown as reference numeral 66 in FIGS. 2-7 and 10). The data message 86 could include information associated with a ringtone selected by a telecommunications system (shown as reference numeral 56 in FIGS. 2-7 and 10) to accompany the incoming telephone call 140. The data message 86 could also include telephone network information (such as that information provided by the telephone network information server 116 of FIG. 10) provided by the telecommunications system. When the data message 86 is received, the digital signal processor 120 interfaces with the Client Ringtone Module 20 and with the internal memory device 122 and/or the external memory device 124. The Client Ringtone Module 20 instructs the digital signal processor 120 to retrieve the selected ringtone from a selection of ringtones 142 stored in the memory device. The ringtone is selected based upon the information contained within the data message 86 as previously discussed.

Once the ringtone is selected, the apparatus 118 presents the ringtone. The digital signal processor 120 interfaces with a ringtone generator system 144. The ringtone generator system 144 executes the selected ringtone file and provides the ringtone. The digital signal processor 120 and the ringtone generator system 144 could also interface with an external speaker/microphone (mic) system 146 to audibly present the selected ringtone. If the selected ringtone includes graphic or animation content, the digital signal processor 120 and the ringtone generator system 144 could also interface with the input/output processor 126 and with the display 132 to visually present the selected ringtone. When the incoming telephone call 140 is received, the user could then use a conventional analog handset speaker/microphone 148 to interface with the digital signal processor 120 and accept the telephone call 140.

The Client Ringtone Module (shown as reference numeral 20 in FIG. 1) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Client Ringtone Module to be easily disseminated. A computer program product for providing custom ringtones for wireline telephones comprises the computer-readable medium and the Client Ringtone Module. The Client Ringtone Module is stored on the computer-readable medium.

The Client Ringtone Module may be physically embodied on or in any addressable (e.g., HTTP, I.E.E.E. 802.11, Wireless Application Protocol (WAP)) wireless device capable of audio presentation. Examples could include a wireless personal digital assistant (PDA) and a wireless handheld/palmtop device, such as a Pocket PC.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:

receiving an incoming call from a calling party to a called party's wireline telephone that has a wireline connection;

suspending processing of the call;

querying a ringtone server for a name of a ringtone associated with a called number;

retrieving the name of the ringtone for the incoming call;

sending a data message over the wireline connection to the called party, the data message identifying the name of the ring tone to be retrieved from memory by the called party's device; and simultaneously with sending the data message, routing the incoming call over the wireline connection to the called party's wireline telephone such that the ring tone is simultaneously presented with the incoming call.

2. A method according to claim 1, wherein retrieving the ringtone includes retrieving the name of the ringtone based upon a time of day.

3. A method according to claim 1, wherein retrieving the ringtone includes retrieving the name of the ringtone based upon a day of week.

4. A method according to claim 1, wherein retrieving the ringtone includes retrieving the name of the ringtone associated with a telephone number of the calling party.

5. A method according to claim 1, wherein sending the data message includes sending the data message to an Internet Protocol address associated with the called party.

6. A method according to claim 1, further comprising querying for an Internet Protocol address of the called party.

7. A system, comprising:
a processor executing code stored in memory that causes the processor to:
receive an incoming call over a telephony network from a calling party to a called party's wireline telephone that has a wireline connection to the telephony network;
suspend processing of the call;
query a ringtone server for a name of a ringtone associated with a called number;
retrieve the name of the ringtone for the incoming call;
send a data message to the called party over the wireline connection to a data network, the data message identifying the name of the ring tone to be retrieved from memory by the called party's device; and
simultaneously route the incoming call over the telephony network to the called party's wireline telephone with the sending of the data message over the data network, such that the ring tone is simultaneously presented with the incoming call at the called party's device.

8. A method, comprising:
receiving an incoming call over a wireline connection to a telephony network;
receiving a data message over the wireline connection to a data network, the data message identifying a name of a ringtone for the incoming call to a wireline telephone;
querying a database of ringtones for the name of the ringtone;
retrieving the ringtone; and
simultaneously presenting the ringtone with the incoming call to alert of the incoming call to the wireline telephone.

9. A method according to claim 8, further comprising receiving a selection of ringtones from a data network and storing the ringtones in memory.

10. A method according to claim 8, further comprising associating the ringtone with an hour of a day.

11. A method according to claim 8, further comprising associating the ringtone with a day of a week.

12. A method according to claim 8, further comprising associating the ringtone with a telephone number of the calling party.

13. A method according to claim 8, wherein presenting the ringtone includes audibly presenting the ringtone.

14. A method according to claim 8, wherein presenting the ringtone includes visually presenting the ringtone.

15. A computer program product comprising a computer readable medium storing processor-executable instructions for performing a method, the method comprising:
receiving an incoming call over a wireline connection to a telephony network;
receiving a data message over the wireline connection to a data network, the data message identifying a name of a ringtone for the incoming call to a wireline telephone;
querying a database of ringtones for the name of the ringtone;
retrieving the ringtone; and
simultaneously presenting the ringtone with the incoming call to alert of the incoming call to the wireline telephone.

16. An apparatus, comprising:
means for receiving an incoming call;
means for receiving a data message from a wireline connection, the data message identifying a name of a ringtone for the incoming call to a wireline telephone;
means for querying a database of ringtones for the name of the ringtone;
means for retrieving the ringtone; and
means for simultaneously presenting the ringtone with the incoming call to alert of the incoming call to the wireline telephone.

17. An apparatus according to claim 16, further comprising means for associating the ringtone with an hour of a day.

18. An apparatus according to claim 16, further comprising means for associating the ringtone with a day of a week.

19. An apparatus according to claim 16, further comprising means for associating the ringtone with a telephone number of the calling party.

* * * * *